INVENTOR.
PAUL J. HECKMAN, JR.
BY
MICHAEL F. OGLO
ROY MILLER
ATTORNEYS.

United States Patent Office 3,499,110

Patented Mar. 3, 1970

3,499,110

TELEVISION MONITORING SYSTEM FOR PENETRATING A LIGHT BACKSCATTERING MEDIUM

Paul J. Heckman, Jr., Pasadena, Calif., assignor to the United States of America as represented by the Secretary of the Navy Filed June 14, 1967, Ser. No. 646,126
Int. Cl. H04n 5/38
U.S. Cl. 178—7.2 5 Claims

ABSTRACT OF THE DISCLOSURE

The invention is a television monitoring system for penetrating a medium which tends to backscatter light, and therefore has special utility in connection with underwater operations. The system includes a periodically pulsed laser light source which emits extremely short bursts of illumination having a duration of the order of 10 nanoseconds. The system video signal is produced by an image orthicon television camera tube of the type in which combined magnetic and electrical potential fields focus electrons emitted from the photocathode onto a charge storage surface called the "target." The camera tube is operated with the combined magnetic and electrical potential field continuously energized. An image converter tube is disposed in optical series between the object scene and the photocathode of the image orthicon tube. Associated objective and relay lens systems are disposed ahead of the image converter tube and intermediate the image converter tube and the camera tube, respectively. The 20 kv. operating potential which is needed to enable the image converter tube to transmit an image is applied to the image converter tube as a periodic pulse signal, also of a 10 nanosecond order of duration. The image converter operating potential pulse is in adjustably delayed phase relationship to the illumination pulse, with a capability of adjustment resolution in the order of nanoseconds.

This invention is in some respects an improvement to that disclosed in the applicant's copending application S.N. 592,664, filed Nov. 7, 1966, entitled "Television Monitoring System for Penetrating a Light Backscattering Medium."

The invention described herein may be manufactured and used by or for the Government of the United States of America for governmental purposes without the payment of any royalties thereon or therefor.

This invention relates to a range discriminative television monitoring system of the type which employs a pulsed illumination source, and then gates the illumination reflected from a target to sense only the inputs from a predetermined range of distances from the system camera. A particular utility of this type of system is in penetrating a medium which tends to backscatter light, such as water.

The above referenced copending application discloses a range discriminative television monitoring system utilizing the electron focusing arrangement between the photocathode and target of an image orthicon tube as the point of gating the reflected illumination. More particularly, the image orthicon tube's electron focusing arrangement employs a combined magnetic flux and electric potential fields, and the gating action in that system is obtained by pulsing the potential component of the combined magnetic and potential fields. A relatively well shaped gate pulse is needed for that system in order to produce good fidelity of the output picture. The shortest duration of pulse which provides this quality of pulse shape, and which can be obtained by state-of-the-art pulse shaping circuitry, is approximately 20 nanoseconds. A system employing a 20 nanosecond pulse has a minimum range of 15 feet and a range resolution of 15 feet. While the range resolution and minimum range of that system is useful for many purposes, it is sometimes necessary to have finer range resolutions and shorter minimum ranges of operation. One example of such a need is in underwater submarine rescue operations in a silty ocean bottom environment. The event of the disabled submarine settling to the bottom and the motion of a rescue craft disperses clouds of silt which remain for long periods. As a result, objects can only be seen at short ranges using a high resolution range discriminative system.

An objective of the invention is to provide a range discriminative television system having a shorter minimum range and a finer range resolution than heretofore possible with the prior art.

Another objective is to provide a system in accordance with the first objective, which provides good fidelity of output picture using the less than ideal pulse waveshapes obtainable with state-of-the-art circuitry.

Other objects and many of the attendant advantages of this invention will be readily appreciated as the same becomes better understood by reference to the following detailed description when considered in connection with the accompanying drawings wherein.

Figures 1, 2, 3:
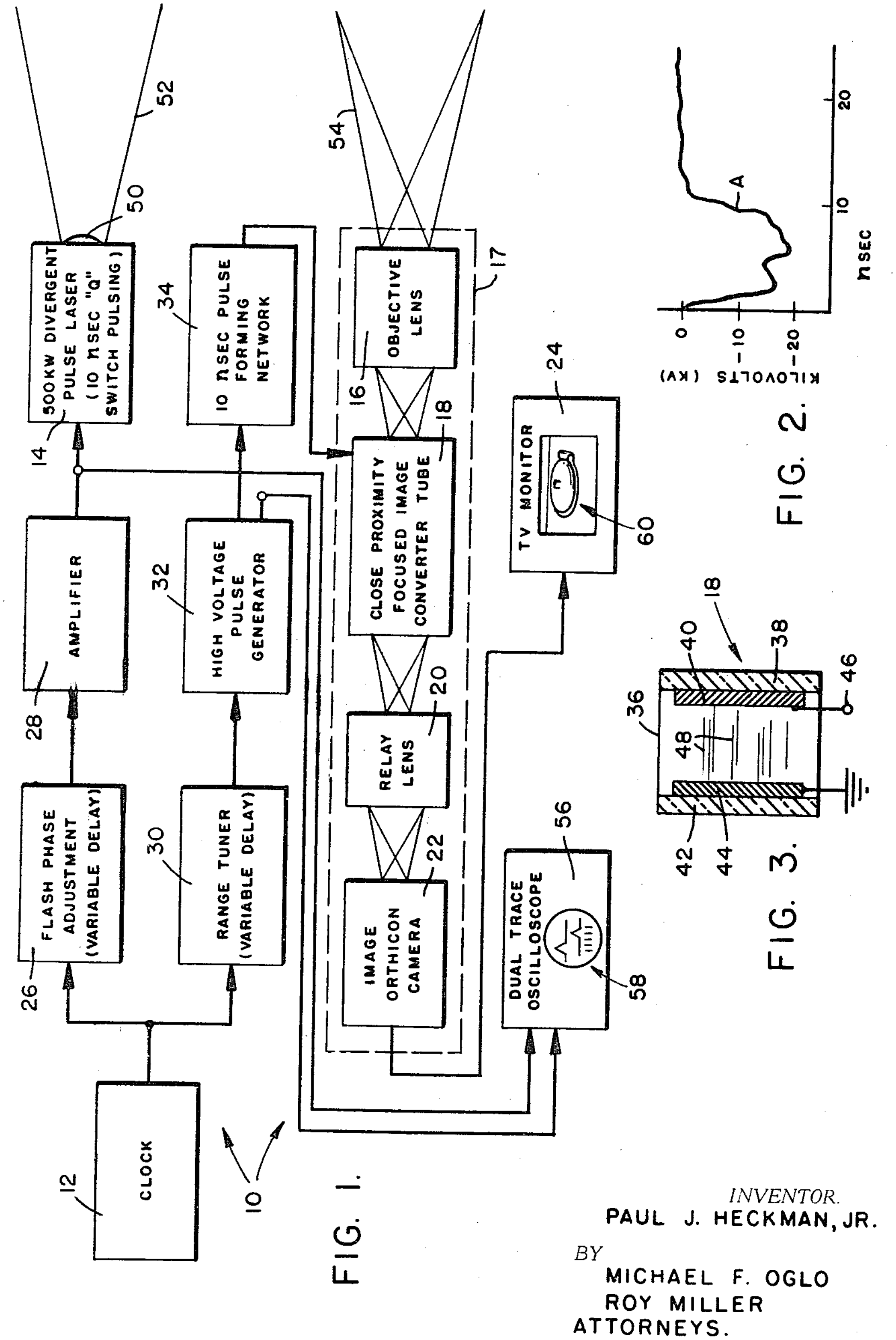
FIG. 1 is a block diagram of an improved range discriminative television system in accordance with the present invention.
FIG. 2 is a waveform associated with the operation of the system of FIG. 1.
FIG. 3 is a diagrammatic illustration of the close proximity focused image converted tube employed in the system of FIG. 1.

Referring now to the drawing and in particular to FIG. 1, the subject of the invention is a television monitoring system 10 of special utility for underwater use. System 10 comprises a time base clock circuit 12, a pulse laser 14, and an electronically gated television camera assembly 17 consisting of an objective lens 16, a close proximity focused image converter tube 18, a relay lens 20, and an image orthicon camera 22 disposed in optical series. An associated television monitoring screen 24 provides the system output display. Pulse laser 14 is synchronized to the time base clock 12 by a flash synchronization channel comprising a flash phase adjustment circuit 26 formed by a variable delay network having a 1.0 nanosecond order of resolution, and an amplifier 28. Circuits 26 and 28 may be of any signal circuit construction suitable for processing trigger signals. Operation of the converter tube 18 is synchronized to the time base clock by an image converter gating delay channel comprising a range tuner 30, a high voltage pulse generator 32, and a 10 nanosecond pulse forming network 34. Range tuner 30 comprises a variable delay circuit having a nanosecond resolution capability for delaying the clock signal. The delayed clock signal triggers the high voltage (20 kv.) pulse generator 32. The output from generator 30 is then shaped by the 10 nanosecond pulse forming network 34. The resultant output signal from the image converter gating delay channel is a 20 kv. pulse having an approximate duration of 10 nanoseconds. In the case of high voltage pulses with pulse durations of the order of 10 nanoseconds, accurately square pulse shapes cannot be obtained with state-of-the-art circuitry. A typical actual waveshape of signal at the output of pulse forming network 34 is depicted as Wave A, FIG. 2. One specific, commercially-available, type of pulse forming network 34 is, for example, the reflective transmission line type manufactured by Beckman-Whitley, a subsidiary of Technical Operations, Inc., Mountain View, Calif., under the designation PFNT–10.

Close proximity focused image converter tube 18, diagrammatically shown in FIG. 3, is of conventional construction comprising a cylindrical evacuated envelope 36. The front end of the tube is formed by a transparent glass end wall 38 having a cesium-type photosensitive (electron emissive) layer 40 over its inside face. The output end is formed by another transparent glass 42 wall having a phosphorescent inside layer 44. The phosphorescent coating 44 is returned to ground potential and layer 40 is connected to an electric terminal 46. Tube 18 is employed as an electronic shutter responsive to a gate signal applied to terminal 46. When the photosensitive layer 40 is at ground potential, its electron emission is *not* transmitted across the space separating it and layer 44, and the arrangement acts as a closed shutter. When a gate voltage of —20 kv. (nominal) is applied to terminal 46 the electron image is accelerated across the space as a stream of electrons 48, which impinges upon the phosphorescent layer 44 producing a light-image replica of the optical image applied to the front end wall 38. The term "close proximity focused" in the designation of the tube image converter tube 18, refers to its mode of operation in focusing the electrons from layer 40 onto layer 44. More particularly, it refers to the fact that layers 40 and 44 are arranged in sufficiently close proximity to one another to enable the focusing to be achieved by the direct application of a predetermined high potential (the 20 kv., nominal) across the layers. The 10 nanosecond synchroniaztion pulse signal, Wave A, is applied to terminal 46 to act as the shutter opening signal. One specific, commercially-available type of close proximity focus image converter tube 18 is, for example, that manufactured by Abtronics, Inc., Livermore, Calif., under the designation PD 25. Objective lens 16, FIG. 1, forms the front end of gated television camera assembly 17, and relay lens 20 focuses the light image appearing at the rear end of the tube 18 onto the front end of the image orthicon camera tube 22.

The structure and mode of operation of the image-orthicon type television camera tube is conventional and well known, these structural details being omitted in the drawing. (A diagrammatic of its salient structure may be seen in the drawing of the earlier referenced copending application.) Briefly, the front end of image orthicon tube includes a glass end wall having an electronic emissive photocathode layer on its inner surface. A target plate surface of a material which stores an electron image is disposed in rearwardly axially spaced relationship to the photocathode. Associated with the photocathode and target is an electron focusing arrangement comprising a focusing flux field coil device, which is disposed about the camera tube, and concentrically alinged with the tube axis. When an energizing current is flowed through this coil and a predetermined operating potential applied between photocathode and the plate, the electrons emitted from the photocathode are focused onto the target where they form an electron charge replica of the optical image focused on the photocathode. In accordance with the present invention, the image orthicon tube is conventionally operated with the energizing current continuously supplied to its focusing flux field coil device and the prescribed operating potential continuously applied between its photocathode and target, so that whenever a light image appears on the rear face of image converter tube 18 it is directly translated into an electron charge image on the target. The charge image remains stored on the surface of the target until conventionally scanned by a low velocity electron scan beam which passes close to the target plate and drops off the electrons. This imposes modulation upon the electron beam, which is subsequently transformed into the video signal at the camera tube's collector electrode. The scan beam follows a conventional broadcast television raster pattern which covers the full field of the area of the target plate at the conventional rate of 60 times per second. The scan pattern includes a blanking period in which the electron beam is blanked out while the electron beam trajectory deflection circuitry performs its "flyback" from the end of the scan pattern of one field to the start of the scan pattern for the next field. The start of the scanning cycle of each field is kept in a predetermined phase relation to the 10 nanosecond gate signal applied to terminal 44, in order to avoid jitter. Also, this phase relationship preferably is such that the 10 nanosecond signal coincides with blanking period of the scan cycle in order to avoid streaking. This may be done by any of the well known techniques for adjustment of phase synchronism.

Pulse laser 14 provides a high intensity flash of a duration matched to the period of the gating pulse applied to the orthicon tube, i.e. 10 nanoseconds. The pulse laser must also be accurately synchronizable by trigger signals. Successful embodiments of system 10 have made use of a laser pulsed by conventional rotating prism "Q-switching." Kerr cell or Pockle cell methods of pulsing could also be used. For underwater work, the laser should preferably produce a blue-green type light which is matched to the spectral transmission characteristics of water. Successful results were obtained using a neodymium-doped ¼" diameter yttrium aluminum garnet (YAG) rod, 1½" long, with a polished surface at one end and a total reflecting wedge on the other. An optical flat with a dielectric coating peaked for 50% reflectivity at 1.06 microns completes the laser cavity. The second harmonic at 5,300 angstroms is generated (with an efficiency of 5%) by passing the intense 1.06 micron radiation to a potassium di-hydrogen phosphate (KDP) crystal outside the cavity. Laser output power ratings of 500 kilowatts, or more, are desired for underwater work. Lasers having these characteristics are commercially available from Electro-Optical Systems, Inc., Pasadena, Calif. Laser 14 is also provided with a divergent lens system 50, FIG. 1, providing a cone of illumination 52 having an included angle which is suited for the intended ranges of operation of the system. The objective lens 16 for the television camera provides a matching cone of view 54.

The time base clock 12 produces synchronization pulses at the rate of field scan of television camera 22, i.e. 60 c.p.s. The trigger signal from amplifier 28 in the flash synchronization channel, and the signal from high voltage pulse generator 32 in the camera gating delay channel, are applied to one and the other of the inputs of a dual trace oscilloscope 56 having a nanosecond order of sweep resolution. The signal applied to the oscilloscope 56 from high voltage generator 32 is conventionally attenuated by suitable coupling and wave shaping circuitry, not shown. The sweep of the dual trace oscilloscope is provided with a calibrated scale 58 in range equivalents of nanosecond delay times, to enable an operator to perform range tuning with direct reference to a distance scale. The proportionality relationship for converting nanosecond delay times, to their range equivalent in feet is approximately 4:3. For example, a delay of 10 nanoseconds is equivalent to tuning the television system to pick up a picture at a depth field starting at a minimum distance of 7½ feet from the camera tube. The proportionality relationship is based upon the two-way distance (to a reflecting object and back) over which light may travel in the period of the delay. This in turn is based upon the velocity of light in the medium in which system 10 is used, namely water.

The operation of television monitoring system 10 will now be described. It is assumed that the operational environment is a manned submersible craft, such as an escape and rescue submersible for removal of personnel from a disabled naval submarine. The pulse laser 14 and gated television camera assembly 17 are mounted to the exterior of the craft adjacent to each other so that the cone of illumination 52 and cone of view 54 cover the same scene. The monitoring screen 24, oscilloscope 56, and range tuning controls are inside the craft. It is further assumed that object of interest (depicted as an escape hatch 60 in the scene displayed in monitor screen 24) is at a slant range distance of 10 feet from the laser and camera assembly.

Two adjustment steps are performed at the commencement of operation. These steps consist of adjusting pulse laser 14 into a phase synchronization condition in which the sync trigger from amplifier 28 appears at the origin of the sweep of the dual trace oscilloscope, and then presetting the delay of the camera gate pulse. The first adjustment is effected by means of the flash phase adjustment 26. The second adjustment is effected by range tuner 30 which is adjusted to "tune in" the desired range of the depth of field to be picked up by system 10. The operator makes this adjustment with reference to the calibrated scale 58 on the dual trace oscilloscope 56. It will be assumed that the operator has chosen a setting of minimum range of 7½ feet, which corresponds to a phase delaying of the output pulse from generator 26 by the amount of 10 nanoseconds relative to the sync pulse from amplifier 28. A setting of 7½ feet represents a typical setting for exploiting the advantages offered by the present invention with the use of state-of-the-art timing circuitry having nanosecond order of resolution. However, experiments have indicated that useful results can be obtained down to half this range by use of 5 nanosecond pulses and 5 nanosecond delay circuitry, provided that requirements of short electrical connections can be met.

At the instant the sync trigger signal from amplifier 28 is applied to the pulse laser 14, the latter emits a high intensity flash of light, which is 10 nanoseconds in duration. The television camera remains in a "closed shutter" condition during the delay before the high voltage gate signal is applied to terminal 46 of the image converter tube 18. Thus, while the light travels from the source to the target none of the backscattering due to the turbidity of the water medium is picked up by electronically gated camera assembly 17. At the moment when the light reflected from a point 7½ feet from the camera is returned, the gate pulse, Wave A, FIG. 2, actuates the camera tube to its open shutter condition. The gate signal enables the camera to collect the light returning to the camera tube during the period that the pulse, Wave A, is applied across the image converter tube, yielding a depth of field of optical image of approximately 7½ feet starting at the 7½ foot minimum distance determined by the delay. The high intensity flash of light reflected from target 56 produces a stored charge image of the object on the target plate of the image orthicon tube 22. When the gate signal terminates, the pickup tube once more returns to its closed shutter condition. This charge on the target plate is converted to a video signal by the conventional low velocity beam scan process. The target plate is completely scanned before the next occurrence of flash and gate signal. This video signal is converted to an electron tube picture by monitor screen 24. The cycle of flashed illumination and pickup of image is repeated at the 60 c.p.s. rate. The television monitor screen shows a picture of object 60 in which backscattered light from the first 7½ feet of range is substantially illuminated.

While the means for relaying of the optical-image from the output side of the image converter tube 18 to the photocathode of camera tube 22 has been illustrated as lens system 20, if desired an optical fiber device (not shown) of fine-image resolution capability could be employed in lieu of the relay lens system.

Also, while camera assembly 17 is illustrated as an assembly of discrete components in optical series, it is to be understood that it could be of unitary construction within a single glass envelope, or the like.

An important feature of the invention is that the close proximity image converter tube type of construction enables implementing the desired 10 nanosecond image gating action, with desired fidelity, in response to the less than ideal waveshapes available from state-of-the-art nanosecond resolution pulse and timing circuitry. This type of construction further provides sufficient output intensity to enable conversion to a video signal by one of the more sensitive state-of-the-art television camera constructions, such as that of the image orthicon camera.

Obviously many modifications and variations of the present invention are possible in the light of the above teachings. It is therefore to be understood that within the scope of the appended claims the invention may be practiced otherwise than as specifically described.

What is claimed is:

1. In a range discriminative television monitoring system for use in viewing an object scene through a medium which tends to backscatter light, the combination comprising:

(a) television camera means for producing a video output signal, said television camera means having a camera input image plane for receiving an optical image and an image storage surface which is periodically scanned to produce the video output signal, said camera tube including means continuously operative to transfer the optical image applied to the camera input image plane to said image storage surface, (b) a periodically pulsed illumination source for emitting pulses of illumination of predetermined pulse duration of the order of magnitude of 10 nanoseconds in the direction of the object scene, (c) an image gate disposed in optical series between the camera tube and the object scene, said image gate comprising an input image plane formed of a photo-responsive electron emissive surface at its front end, an electron energy responsive phosphorescent surface disposed rearwardly from and in spaced relationship to said electron emissive surface, and an electrical signal input for applying an image transfer potential between said surfaces, the electron emissive surface and the phosphorescent surface being arranged in sufficient proximity to each other that the electrons from the electron emissive surface are focused upon the phosphorescent surface in response to the application of a predetermined image transfer potential of the order of 20 kv. to said electrical signal input, (d) objective lens means disposed ahead of the image gate for focusing the object scene upon the image gate input image plane, (e) optical image relaying means disposed between the image gate and the television camera means for relaying the light-image displayed on said phosphorescent surface onto said camera image plane, and (f) adjustable circuit means having a time delay adjustment resolution capability of the order of nanoseconds interconnecting the pulsed illumination source and the image gate, said adjustable circuit means being operative to apply a pulse of said predetermined duration and of a pulse amplitude equal to said image transfer potential to the electrical signal input of the image gate in selectively adjustably delayed timed relationship to each pulse of illumination.

2. Apparatus in accordance with claim 1, wherein;

(g) the optical image relaying means is an optical lens system.

3. Apparatus in accordance with claim 1, wherein;

(h) the optical image relaying means is a fiber optics device.

4. Apparatus in accordance with claim 1, wherein;

(i) said television camera means is of the image orthicon type wherein the input image plane is a photocathode of photo-responsive electron-emissive material, and said image storage surface is a charge storage surface disposed rearwardly and in spaced relationship to the photocathode, and said means to transfer the optical image includes a magnetic flux and electrical potential field between the photocathode and the charge storage surface to focus the electrons on the charge storage surface.

5. Apparatus in accordance with claim 1, wherein;
(j) said pulsed illumination source is a laser, employing a Q-switch type pulsing system.

References Cited

UNITED STATES PATENTS

| | | | |
|---|---|---|---|
| 2,960,914 | 11/1960 | Rogers | 250—199 |
| 2,996,946 | 8/1961 | Brendholdt | 178—7.2 |
| 3,305,633 | 2/1967 | Chernoch | 178—6.7 |
| 3,446,555 | 5/1969 | Kahn | 178—6 |

ROBERT L. GRIFFIN, Primary Examiner

A. H. EDDLEMAN, Assistant Examiner

U.S. Cl. X.R.

250—199